Patented Aug. 7, 1951

2,563,367

UNITED STATES PATENT OFFICE 2,563,367

MANUFACTURE OF LEAD SILICATE

Norman John Read, Greenford, England, assignor to Goodlass Wall & Lead Industries Limited, Oxted, England No Drawing. Application February 21, 1949, Serial No. 77,695. In Great Britain March 9, 1948

6 Claims. (Cl. 23—110)

It is known that silicate of lead can be made by sintering or fusing. It is also known that products containing lead silicate can be made by precipitation.

The invention provides a new form of hydrated lead silicate having good properties as a light-stable, white pigment, which is effective in paint in the protection of iron and steel against corrosion and a wet process whereby it can be made. The lead silicate according to the invention differs from that obtained by heating lead monoxide with silica in a furnace in that it is hydrated. In addition, lead silicate made according to the invention is white and stable to light.

According to the invention, hydrated lead silicate is made by grinding a mixture of lead monoxide and silicic acid, preferably freshly precipitated silicic acid in gelatinous form, in water in the presence of an acid catalyst. Under these conditions interaction occurs between the lead monoxide and the silicic acid to produce a hydrated lead silicate which, after removal of the liquid by filtering, centrifuging or in any other convenient way, and drying is ready for use as a pigment. Examples of suitable acid catalysts are acetic acid, formic acid and nitric acid. These will be utilised in small proportions only, and though they may combine with a small portion of the lead monoxide to form the corresponding lead salts, these lead salts will generally be soluble salts which will be separated from the lead silicate when the latter is separated from the liquor in which the reaction takes place. As an alternative to using lead monoxide, lead hydroxide may be used, the lead hydroxide being either of formula $Pb(OH)_2$ or a basic lead hydroxide of formula $Pb(OH)_2, xPbO$.

To obtain a white pigment, it is necessary that the whole of the lead should enter into combination. I may use an excess of silicic acid, but preferably the proportions are such that the content of uncombined silica in the final product is a minimum.

I find it convenient, but not essential, to add to the mixture, before, during or after grinding, a small amount of sulphuric acid in addition to the acid catalyst, as this addition has been found to prevent the lead silicate from forming a hard cake and so facilitates separation of the lead silicate from the mother liquid. The amount of sulphuric acid so added may conveniently be of the order of 0.5% by weight of the resultant pigment.

I prefer to carry on the grinding operation until interaction is completed, and the whole of the lead is in combination. It is, however, not essential to carry on the grinding operation until the interaction is complete because by warming the mixture, for example to 100° C., when the interaction has gone part way to completion the time required to bring the lead oxide or lead hydroxide into combination is thereby shortened. When the silicic acid employed is freshly precipitated gelatinous silicic acid, the interaction takes place quickly. If, however, the silicic acid is used some time (e. g. 3 days) after precipitation the interaction proceeds more slowly and in such cases it may be convenient to warm the mixture, as just noted, in order to accelerate the completion of the interaction.

Lead silicate made by the process according to the invention has been found to have the following characteristics:

(a) Good stability to light as a dry powder or in paint form.

(b) Fine and uniform particle size giving good texture in paint form.

(c) Good staining resistance, provided the lead oxide content of the product is reasonably high.

(d) Good suspension in paint vehicles.

(e) Good storage stability in paint form.

(f) The product is of a good white colour.

The following are examples of the manufacture of lead silicate by the process according to the invention, the proportions quoted being, in each case, proportions by weight:

(a) The following mixture was ground in a porcelain ball mill for 4 hours:

| | Parts |
|---|---|
| Silicic acid gel | [1] 1000 |
| Litharge | 870 |
| Acetic acid | 8 |
| Water | 600 |

[1] Silica content 13% by weight.

After grinding, the lead silicate was separated from the mother liquor, washed once and dried at 105° C.

The product had the following characteristics:

Colour—good white.

Staining resistance—equal to good quality chamber white lead.

Oil absorption—8%.

Stability to light—stable either dry or in paint form.

Typical composition:

| | | |
|---|---|---|
| Lead oxide | per cent | 86 |
| Silica | do | 13 |
| Water | do | 1 |

Particle size—all under 3 microns.

(b) The following mixture was ground in a porcelain ball mill:

| | Parts |
|---|---|
| Silicic acid gel | [1] 1400 |
| Litharge | 870 |
| Nitric acid | 10 |

[1] Silica content 12% by weight.

After 6 hours' grinding 5 parts by weight of sulphuric acid was added and grinding was continued for 2 hours. The lead silicate was separated from the mother liquor, washed once by decantation and dried at 105° C.

The product had the following characteristics:

Colour—good white.
Staining resistance—Equal to good quality chamber white lead.
Oil absorption—11%.
Typical composition:

| | per cent | |
|---|---|---|
| Lead oxide | per cent | 82.0 |
| Sulphate expressed as $SO_3$ | do | 0.5 |
| Silica | do | 16.0 |
| Water | do | 1.5 |

Particle size—bulk under 3 microns, fair amount 3–6 microns.

(c) The following mixture was ground in a porcelain ball mill:

| | Parts |
|---|---|
| Silicic acid gel | [1] 527 |
| Moist lead hydroxide | [2] 418 |
| Acetic acid | 5 |
| Water | 150 |

[1] Silica content 12.8% by weight.
[2] Lead oxide content 86% by weight.

After 2 hours' grinding, 8 parts of sulphuric acid solution (1.2 sp. gr.) were added and grinding was continued for a further half-hour.

The lead silicate was separated from the mother liquor, washed, and dried at 105° C.

The product had the following characteristics:

Colour—good white.
Staining resistance—equal to good quality chamber white lead.
Oil absorption—19.6%.
Typical composition:

| | | |
|---|---|---|
| Lead oxide | per cent | 80.7 |
| Silica | do | 16.3 |
| Sulphate expressed as $SO_3$ | do | 0.5 |
| Water | do | 2.5 |

While hydrated lead silicate, prepared as described in any of the foregoing examples, is eminently suitable for direct use as a pigment, it may, if desired, be heated, prior to use as a pigment, to remove some or all of the water of hydration. This can readily be effected by heating to a temperature of about 250° C.

What I claim as my invention and desire to secure by Letters Patent is:

1. A process for making hydrated lead silicate, by interaction in the presence of water between silicic acid and a compound selected from the group consisting of lead monoxide and lead hydroxide, which consists in grinding in water a mixture of silicic acid and said compound without preliminary furnacing of said mixture and in the presence of an acid catalyst, and thereafter separating the resulting hydrated lead silicate from the water, and drying said hydrated lead silicate.

2. A process as claimed in claim 1, wherein the proportions of silicic acid and of said compound are such that the whole of the lead enters into combination and the resulting hydrated lead silicate contains no substantial amount of uncombined silica.

3. A process as claimed in claim 1, wherein said acid catalyst is acetic acid.

4. A process as claimed in claim 1, wherein said acid catalyst is nitric acid.

5. A process as claimed in claim 1, which comprises the step of adding sulphuric acid to the mixture prior to separation of the hydrated lead silicate from the water.

6. A process for making hydrated lead silicate, by interaction in the presence of water between freshly precipitated silicic acid and a compound selected from the group consisting of lead monoxide and lead hydroxide, which consists in grinding in water a mixture of freshly precipitated silicic acid and said compound without preliminary furnacing of said mixture and in the presence of an acid catalyst, and thereafter separating the resulting hydrated lead silicate from the water, and drying said hydrated lead silicate.

NORMAN JOHN READ.

REFERENCES CITED

The following references are of record in the file of this patent:

UNITED STATES PATENTS

| Number | Name | Date |
|---|---|---|
| 2,268,913 | Turbett et al. | Jan. 6, 1942 |
| 2,379,270 | Barton | June 26, 1945 |
| 2,391,118 | Barton | Dec. 18, 1945 |